United States Patent
Anderson

(10) Patent No.: US 8,898,124 B2
(45) Date of Patent: Nov. 25, 2014

(54) CONTROLLING DATABASE TRIGGER EXECUTION WITH TRIGGER RETURN DATA

(75) Inventor: Mark J. Anderson, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/969,987

(22) Filed: Dec. 16, 2010

(65) Prior Publication Data

US 2012/0158679 A1 Jun. 21, 2012

(51) Int. Cl.
G06F 7/00 (2006.01)
G06F 17/00 (2006.01)
G06F 17/30 (2006.01)

(52) U.S. Cl.
CPC .................. G06F 17/3051 (2013.01)
USPC ........................................................ 707/702

(58) Field of Classification Search
USPC ........................................................ 707/702
See application file for complete search history.

(56) References Cited

U.S. PATENT DOCUMENTS

| | | | |
|---|---|---|---|
| 5,870,746 A | 2/1999 | Knutson et al. | |
| 5,926,819 A | 7/1999 | Doo et al. | |
| 6,356,895 B1 * | 3/2002 | Anderson et al. | 1/1 |
| 6,363,325 B1 * | 3/2002 | Bates et al. | 701/301 |
| 6,374,236 B1 | 4/2002 | Chen et al. | |
| 6,405,212 B1 * | 6/2002 | Samu et al. | 1/1 |
| 6,684,215 B1 | 1/2004 | Saracco | |
| 7,089,228 B2 | 8/2006 | Arnold et al. | |
| 7,133,875 B1 | 11/2006 | Chatterjee et al. | |
| 7,493,317 B2 | 2/2009 | Geva | |
| 7,499,953 B2 | 3/2009 | Krishnaswamy et al. | |
| 2002/0184207 A1 * | 12/2002 | Anderson et al. | 707/4 |
| 2002/0194189 A1 * | 12/2002 | Anderson et al. | 707/102 |
| 2003/0106042 A1 * | 6/2003 | Lynch et al. | 717/109 |
| 2003/0135480 A1 | 7/2003 | Arsdale et al. | |
| 2005/0004887 A1 * | 1/2005 | Igakura et al. | 707/1 |
| 2005/0125371 A1 * | 6/2005 | Bhide et al. | 707/1 |
| 2005/0228791 A1 * | 10/2005 | Thusoo et al. | 707/6 |
| 2005/0289014 A1 * | 12/2005 | Butler | 705/26 |
| 2009/0125482 A1 | 5/2009 | Peregrine et al. | |
| 2010/0042619 A1 * | 2/2010 | Jones et al. | 707/5 |

OTHER PUBLICATIONS

Dayal et al., The HiPAC Project: Combining Active Databases and Timing Constraints, Mar. 1988,vol. 17, issue 1, pp. 51-70.*
Trajcevski et al., "Evolving Triggers for Dynamic Environments", 2006, EDBT, vol. 3896, pp. 1039-1048.*
M. Nair, "How to Audit or Bypass Trigger Execution Using CONTEXT_INFO()", published on-line at: http://code.msdn.microsoft.com/SQLExamples/WikiNiew.aspx?title=AuditOrBypassTriggerExecution, dated May 5, 2008, publication printed Dec. 10, 2010.
M. Rennhackkamp, "Trigger Happy", published on-line at http://www.dbrnsmag.com/9605d17.html, dated May, 1996, publication printed May 19, 2009.

* cited by examiner

Primary Examiner — Taelor Kim
(74) Attorney, Agent, or Firm — Roy W. Truelson

(57) ABSTRACT

A database trigger generates a return code having the effect of inhibiting further executions of the trigger within a pre-defined scope of execution. Preferably, the pre-defined scope is a task or process executing on behalf of a particular user. Upon first encountering the applicable trigger condition, the corresponding trigger is fired normally. Internal logic within the trigger determines whether it is necessary to call the same trigger again within the same scope, and if not, generates corresponding return data. A database management system which manages the trigger and causes it to automatically fire intercepts the return data and disables further firing of the trigger for the pre-defined scope.

20 Claims, 6 Drawing Sheets

|     | All | Trigger A | Trigger B | . . . | Trigger X |
| --- | --- | --- | --- | --- | --- |
| Cond A | 1 | 0 | 1 |   | 0 |
| Cond B | 1 | 0 | 0 |   | 1 |
| Cond C | 0 | 0 | 0 |   | 0 |
| ⋮ |   |   |   |   |   |
| Cond Z | 1 | 1 | 1 |   | 0 |

FIG. 3

CONTROLLING DATABASE TRIGGER EXECUTION WITH TRIGGER RETURN DATA

FIELD OF THE INVENTION

The present invention relates to digital data processing, and in particular to the operation of databases which support triggers and similar user-defined functions.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system has the capability to store mountains of data, and using readily available networks can access even more data. Unfortunately, the capability of digital systems to store and access data has generally outpaced the ability of users to organize or understand the data. Considerable effort has been and continues to be devoted to developing improved techniques for organizing, searching, collating and presenting meaningful information to users from the voluminous data potentially available.

Computer systems may be used to support a variety of applications, but one common use is the maintenance of large databases, from which information may be obtained. Conceptually, a database may be viewed as one or more tables of information, each table having multiple entries (analogous to rows of a table), each entry having multiple respective data fields (analogous to columns of the table). In the case of some tables, the number of entries may be very large. A database management application typically includes capabilities for maintaining the data in the database in a consistent and coherent fashion, for executing queries against the data to obtain information of interest, and for generating and maintaining metadata which can be useful in executing queries, analyzing database performance, and so forth. For example, the database management application will often enforce constraints on particular data fields (data must be of a certain type, within a certain range, or bear a specified relationship with other data in the database), will automatically generate search strategies for executing queries against the data, or will automatically generate and maintain one or more indexes keyed by selective database fields whereby records can be conveniently located according to the value of the key field.

A database management application may be custom written for managing a particular database, but it is often a generic application intended to support different databases having widely varying parameters. The database management application will therefore support a variety of customization options to customize the application for a particular database. For example, the database management application will typically enable a privileged user (such as a system administrator) to define the number of tables in the database, the number of fields in each table, and the type of data in each field. The database management application will further provide an interface whereby other applications executing on behalf of users may invoke its functions to access data in the database.

Among the database customization capabilities offered by some database management applications is support for pre-defined customization functions involving the database, sometimes known as database triggers, or simply triggers. A database trigger is a procedure, defined according to some syntax supported by the database management application, which is executed whenever the corresponding trigger conditions are met. The trigger conditions are defined as part of the trigger. The trigger conditions must be chosen from among a limited range of conditions supported by the database management application. The database management application therefore monitors the trigger conditions, and if the conditions of any defined trigger are satisfied, executes ("fires") the trigger. Triggers may be used, for example, to enforce data integrity constraints, to enforce business policies, to enforce security constraints, to back-up data, or for various other purposes.

Triggers have the advantage of offering a flexible, easily maintainable, centralized control mechanism for customizing the database. Because the trigger executes automatically whenever the pre-defined trigger conditions are met, it is not necessary for user applications which access the database to explicitly invoke the trigger or perform any of the trigger's functions. The trigger itself may contain any required conditional logic to perform the corresponding operation(s) only when required by the circumstances, so that all maintenance of conditions associated with performing an operation is handled in a single place.

Unfortunately, triggers can also impose a significant burden on system performance. There is considerable overhead involved in executing a trigger, i.e., in calling and initializing the trigger procedure. This overhead is incurred whenever the trigger is fired, whether it actually does anything or not. Many triggers are written to address circumstances which rarely arise or arise only with certain users and not others. It is not uncommon for a trigger to fire many times on behalf of a single executing application. In the majority of times these triggers are called, statements near the beginning of the trigger procedure determine that the trigger is inapplicable, and simply return without doing anything. In this case, the overhead burden has already been incurred.

It is possible to provide data structures and/or conditional logic for selectively enabling and disabling a trigger in order to reduce the instances of unnecessary trigger execution, but such mechanisms involve additional complexity and must be maintained consistent with any changes to the trigger or to the needs of the database to apply the trigger's function. Maintaining logic affecting the trigger's function in code or data structures external to the trigger defeats one of the major advantages of the trigger and increases the likelihood of unforeseen errors.

A need exists, not necessarily recognized, for improved techniques for managing database triggers, and in particular for techniques for reducing the instances of unnecessary trigger execution without incurring undue maintenance burdens.

SUMMARY

Upon the first execution of a trigger within a pre-defined scope, the trigger generates return data. At least one of the potential return data generatable by the trigger has the effect of inhibiting further executions of the trigger within the pre-defined scope.

In the preferred embodiment, the pre-defined scope is a task or process executing on behalf of a particular user. Upon first encountering the applicable trigger condition, the corresponding trigger will be fired in the normal fashion. The trigger contains internal logic, i.e. one or more code statements, for determining whether it is necessary to call the same trigger again within the scope of the task or process which invoked it. If the logic determines that it is not necessary to call the trigger again, the trigger generates return data, such as an SQL return code, which so indicates. A database management application which manages the trigger and causes it to automatically fire intercepts the return data and disables further firing of the trigger for the scope of the executing task or process.

In many instances, a trigger will be able to determine, based on the nature of the invoking application, user, or other parameter, that further firing of the same trigger is unnecessary for the scope of the executing task or process. A mechanism for selectively disabling the firing of a trigger in accordance with the preferred embodiment therefore reduces unnecessary firing of the trigger. Furthermore, since the trigger itself is responsible for generating the applicable return data, the conditions upon which further firing of the trigger is disabled are entirely within the control of the trigger itself, and require no maintenance of code or data structures outside the trigger.

The details of the present invention, both as to its structure and operation, can best be understood in reference to the accompanying drawings, in which like reference numerals refer to like parts, and in which:

BRIEF DESCRIPTION OF THE DRAWING

FIG. 3 is a conceptual illustration of a trigger condition table for controlling trigger firing, according to the preferred embodiment.

DETAILED DESCRIPTION

Figure 1:
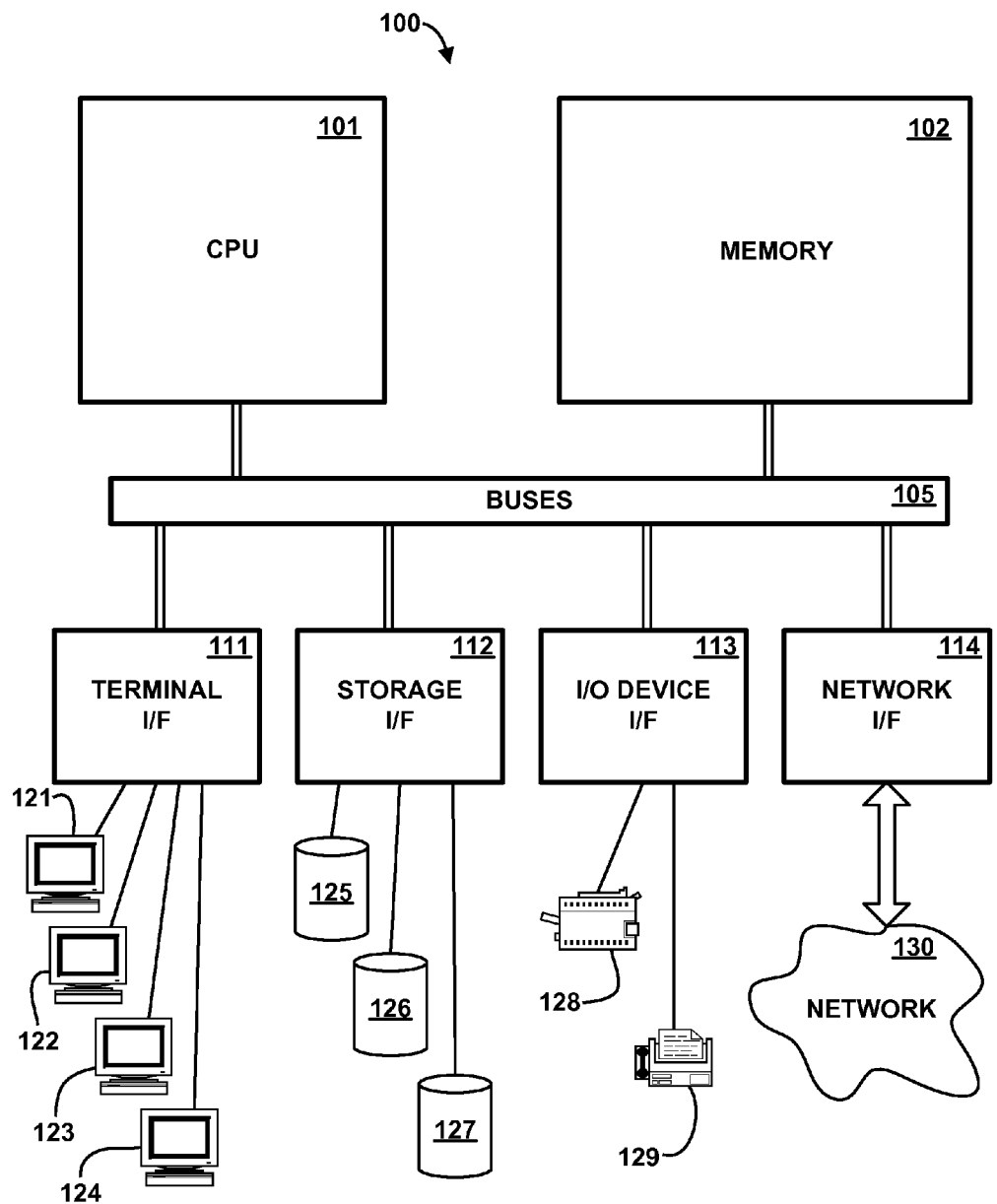
FIG. 1 is a high-level block diagram of the major hardware components of a computer system for use in managing a database having triggers and managing database trigger execution, according to the preferred embodiment of the present invention.

Referring to the Drawing, wherein like numbers denote like parts throughout the several views, FIG. 1 is a high-level representation of the major hardware components of a computer system 100 for use in managing a database having triggers and managing database trigger execution, according to the preferred embodiment of the present invention. Computer system 100 includes at least one general-purpose programmable processor (CPU) 101 which executes instructions and processes data from main memory 102. Main memory 102 is preferably a random access memory using any of various memory technologies, in which data is loaded from storage or otherwise for processing by CPU 101.

One or more communications buses 105 provide a data communication path for transferring data among CPU 101, main memory 102 and various I/O interface units 111-114, which may also be known as I/O processors (IOPs) or I/O adapters (IOAs). The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to one or more external networks 130 (of which one is shown) for communication with one or more other digital devices. Network 130 may be any of various local or wide area networks as are known in the art, and in particular may be the Internet.

It should be understood that FIG. 1 is intended to depict the representative major components of computer system 100 at a high level, that individual components may have greater complexity than represented in FIG. 1, that components other than or in addition to those shown in FIG. 1 may be present, and that the number, type and configuration of such components may vary, and that a large computer system, such as a server for providing database services to multiple clients communicating over a network, will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 105 are shown in FIG. 1 as a single entity, in fact communications among various system components is typically accomplished through a complex hierarchy of buses, interfaces, and so forth, in which higher-speed paths are used for communications between CPU 101 and memory 102, and lower speed paths are used for communications with I/O interface units 111-114. Buses 105 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 105 from various communications paths running to the various I/O devices, it would alternatively be possible to connect some or all of the I/O devices directly to one or more system buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might be used to provide a user interface to users executing applications which access a database (similar to client applications which invoke a server to access a database over a network), but which execute directly on computer system 100, without the need to communicate through a network. System 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a multi-user computer system, such as a computer system based on the IBM i/Series™ architecture, it being understood that the present invention could be implemented on other computer systems.

Figure 2:
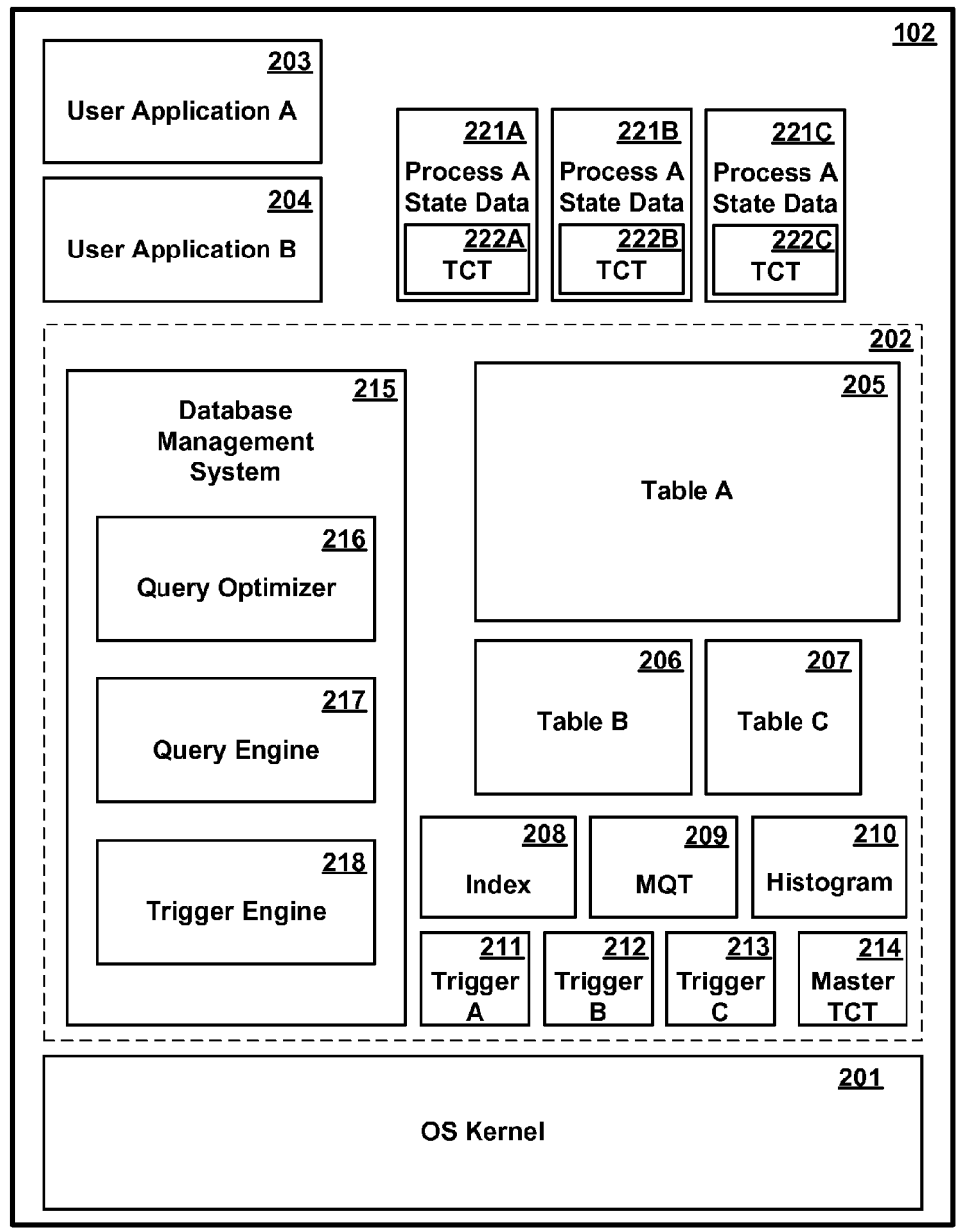
FIG. 2 is a conceptual illustration of the major software components of the computer system of FIG. 1, according to the preferred embodiment.

FIG. 2 is a conceptual illustration of the major software components of system 100 in memory 102. Operating system kernel 201 is executable code and state data providing various low-level software functions, such as device interfaces, management of memory pages, management and dispatching of multiple tasks, etc. as is well-known in the art. A structured database 202 contains data which is maintained by computer system 100 and for which the system provides access to one or more users, who may be directly attached to system 100 or may be remote clients who access system 100 through a network using a client/server access protocol. System 101 may further include one or more user application programs 203, 204, of which two are shown for illustrative purposes in FIG. 2, it being understood that the number may vary, and that system 100 need not necessarily include any user applications. User applications 203, 204 may include applications which access database 202 similar to remote clients, e.g., financial applications which access financial data in a financial database, or may be unrelated applications.

Database 202 contains one or more tables 205-207 (of which three are shown in FIG. 2), each having a plurality of entries or records, each entry containing at least one (and usually many) fields, as is well known in the art. Database tables 205-207 might contain almost any type of data which is provided to users by a computer system. Associated with the database tables are one or more auxiliary data structures 208-210, also sometimes referred to as metadata. Auxiliary data structures characterize the structure of the database and data therein, and are useful in various tasks involved in database management, particularly in executing queries against the database. Examples of auxiliary data structures include database index 208, materialized query table (MQT) 209, and histogram 210, it being understood that other types of metadata may exist.

Database management application 215 is one or more computer programs containing executable code and associated state data providing basic functions for the management of database 202. Database management application 215 may theoretically support an arbitrary number of database tables, which may or may not have related information, although only three tables are shown in FIG. 2. Database management application 215 preferably allows users to perform basic database operations, such as defining a database, altering the definition of the database, creating, editing and removing records in the database, viewing records in the database, defining database auxiliary data structures such as indexes and materialized query tables, and so forth. Database management application 215 further supports the making of queries against data in database tables 205-207. Preferably, query support functions in database management application 215 include query optimizer 216 and query engine 217. Database management application 215 further automatically maintains defined auxiliary database structures (e.g. index 208, MQT 209 and/or histogram 210) concurrently with changes made to records in database tables 205-207. Database management application 215 may further contain any of various more advanced database functions. In the preferred embodiment, database management application 215 implements a structured query language (SQL) query protocol, it being understood that a database management application might alternatively query and structure data according to some other protocol. Although database management application 215 is represented in FIG. 2 as an entity separate from operating system kernel 201, it will be understood that in some computer architectures various database management functions are integrated with the operating system.

In accordance with the preferred embodiment, database management application 215 further includes a trigger engine 218 which executes one or more triggers 211-213, of which three are illustrated in FIG. 2, it being understood that the number of triggers may vary. Each trigger 211-213 comprises a respective defined sequence of instructions to be performed upon the occurrence of one or more respective defined triggering events. The instructions within the trigger conform to some pre-defined syntax for trigger instructions. These instructions could be processor-executable code instructions produced by a compiler, which conform to an instruction code set for the corresponding processor 101. But more frequently, the trigger instructions are instructions in a high-level language which are not directly executable by the processor, but which are interpreted or compiled by trigger engine 218 into processor-executable instructions.

Database management application 215 supports multiple possible triggering events. At a low functional level, this means that the executable computer program code which forms database management application 215 contains instructions which cause trigger conditions to be checked at various code locations, any of which may cause execution of a trigger. The checks performed at these code locations support a set of possible triggering events which can be used to "fire" a trigger, i.e., cause the instructions contained in the trigger to be performed. For each trigger 211-213, one or more respective triggering events is defined. If any of the triggering events is encountered during execution, the trigger is "fired" by invoking the trigger engine to perform the set of instructions contained in the trigger. Triggers 211-213 may support a wide variety of database related functions, limited only by the syntax of the trigger instruction set and the trigger conditions supported by database management application 215.

OS Kernel 201 supports concurrent execution of multiple processes, as is well known in the art. For each concurrently executing process, a respective process state data area 221A, 221B, 221C (herein generically referred to as feature 221) is maintained, each process state data area containing state data particular to the executing process. FIG. 2 depicts three process state data areas 221A, 221B, 221C, it being understood that this number may vary, and is typically much larger. Process state data 221 may include, e.g., a process stack, a process heap, and/or other data structures. In the preferred embodiment, among the state data which may be maintained in process a state data area 221 is a respective trigger condition table 222A, 222B, 222C (herein generically referred to as feature 222) for controlling the firing of triggers, as explained in greater detail herein.

Although a certain number and type of database components (one database 202 having three database tables 205-207, one index 208, one MQT 209, one histogram 210, and three triggers 211-213) are shown in FIG. 2, the number of such entities may vary, and could be much larger. The computer system may contain multiple databases, each database may contain multiple tables, and each database may have associated with it multiple indexes, MQTs, histograms, or other auxiliary data structures not illustrated. Alternatively, some entities represented in FIG. 2 might not be present in all databases; for example, some databases might not contain materialized query tables or the like. Additionally, database 202 may be logically part of a larger distributed database which is stored on multiple computer systems. Although database management application 215 is represented in FIG. 2 as part of database 202, the database management application, being one or more computer programs comprising executable code, is sometimes considered an entity separate from the "database", i.e., the data tables and associated metadata.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex server environment, the number and complexity of such entities is typically much larger. Additionally, although software components 201-218, and 221-222 are depicted in FIG. 2 on a single computer system 100 for completeness of the representation, it is not necessarily true that all programs, functions and data will be present on a single computer system or will be performed on a single computer system. In particular, user applications 203-204 which access a database are often stored and executed on remote or distributed systems, the requests to access the database being transmitted via one or more networks to computer 100.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. In particular, database tables 205-207 are typically much too large to be loaded entirely into memory, and typically only a small portion of the total number of records is loaded into memory at any one time. Furthermore, it will be understood that the conceptual representation of FIG. 2 is not meant to imply any particular memory organizational model, and that system 100 might employ a single address space virtual memory, or might employ multiple virtual address spaces which overlap.

In the preferred embodiment, database management application maintains a respective trigger condition table for each executing process which invokes it. The trigger condition table is used to identify active triggers and fire the triggers when appropriate. The trigger condition table is maintained with other process data in the corresponding process state data area 221. It will be understood that not necessarily all executing processes utilize the functions of database management application 215, and processes which do not would not contain trigger condition tables.

FIG. 3 is a conceptual illustration of a trigger condition table 301, according to the preferred embodiment. Table 301 is conceptually a table of multiple rows and columns, in which each row 302A, 302B, 302C, 302D (herein generically referred to as feature 302) corresponds to a respective pre-defined trigger condition supported by database management application 215, and each column 303A, 303B, 303C (herein generically referred to as feature 303) corresponds to a respective defined trigger. An additional column 304 represents all of the triggers. Each cell of the table (row and column location) is conceptually a single flag bit of data. Table 301 could represent master trigger condition table 214 or any of trigger condition tables 222 associated with a process.

Each pre-defined trigger condition corresponding to a row 302 of table 301 is one of a set of conditions which can be specified to fire a trigger. I.e., database management application 215 as written and compiled by its developer(s) is one or more generic database computer programs which supports a pre-defined set of potential trigger conditions. A trigger is typically written by a system administrator or other user (i.e. a person or persons other than the original developer(s) of database management application 215) to customize a database from the generic database management application program(s). The developer of a trigger can specify any of the pre-defined potential trigger conditions as a condition for the firing of the trigger being developed. Depending on the design of database management application 215, the trigger developer may be able to specify only a single one of the pre-defined conditions for each trigger, or may be able to specify multiple alternative conditions for each trigger. In either case, the trigger developer is limited to this set of pre-defined trigger conditions, for if the trigger developer were able to specify any arbitrary condition, then the trigger developer would have to be able to modify the database management application itself, for example, by having access to the source code. This is generally undesirable from a code maintenance standpoint, and in many cases would violate code licensing restrictions.

A pre-defined trigger condition typically involves some specific code path. The trigger condition might be so simple as a particular code path being taken, meaning that the condition is met whenever the code path is taken. Alternatively, the trigger condition might be a logical conjunction of the code path and the state of specific state data, i.e. the condition is met whenever the code path is taken AND state data meets some pre-defined logical condition.

The executable code which forms database management application 215 contains one or more instructions in each code path associated with a pre-defined trigger condition to cause any triggers associated with the pre-defined trigger condition to fire. These instructions will reference the cell in table 301 at the row 302 corresponding to the pre-defined trigger condition and the column 304 corresponding to all triggers. The cell at column 304 is simply a logical OR of the data in all other cells of the same row, i.e., it indicates whether there is any trigger which is specified to fire on the corresponding pre-defined trigger condition. Thus, by referencing a single bit in table 301, the executable code which forms database management application 215 can quickly determine whether there is any trigger which should be fired. Depending on the condition, it may be necessary to examine other state data as well, although pre-defined conditions are usually fairly simple. This test can be performed very rapidly by in-line code, with little overhead, so that if there is no such trigger, the effect on performance is negligible, even if the code path is taken many times. However, if a trigger is found, then trigger engine 218 is invoked to determine which trigger or triggers need to be executed (fired), and to execute each such trigger. Trigger engine 218 can determine which triggers to fire by examining the corresponding row 302 of table 301, each cell having its bit set indicating a corresponding trigger (the column 303) which should be fired. There is substantial overhead associated with invoking the trigger engine and firing each such trigger.

Preferably, master trigger condition table 214 is automatically updated by an appropriate function within database management application 215 whenever a trigger is created, modified or deleted to reflect the current state of all triggers 211-213 defined for database 202. For example, when a new trigger is created, a new column is added to master trigger condition table 214 for the newly created trigger. Any of the pre-defined conditions specified for invoking the trigger will have flag bits set in the corresponding row(s) at the new column. The column for all triggers 304 will be updated to reflect the new flag bits as required. Analogous changes will be made when a trigger is modified or deleted.

Although trigger condition table 301 is shown conceptually in FIG. 3 as a table containing rows and columns of flag bits, it will be appreciated by those of skill in the art that the data in trigger condition table 301 could be maintained in alternative formats.

Because database management application 215 supports only a limited pre-defined set of trigger conditions, and these must be customizable to support a wide variety of different database functions for different databases, the pre-defined trigger conditions are generally defined broadly so as to encompass any circumstance which might be of interest. Trigger developers typically have to include additional conditional logic within the trigger which further qualifies the circumstances under which the trigger is to perform its intended function. When the trigger is fired, this conditional logic is usually the first thing that gets executed within the trigger. For many triggers, the conditional logic causes the trigger to return without doing anything most of the time. However, by this point the overhead of firing the trigger has already been incurred.

In accordance with the preferred embodiment, this overhead of firing the trigger can be avoided in certain circumstances by including logic within the trigger itself which determines whether subsequent firings of the same trigger should be disabled within the context of the process which caused the trigger to be fired. If the trigger's internal logic determines that it is no longer necessary to fire the trigger for the executing process, it generates return data which so indicates when returning to trigger engine 218. The return data is preferably a specially defined SQL return code (or one of several such specially defined return codes), although it could be any data returned by the trigger. The trigger engine detects this return data, and responsive thereto resets the flag bit or bits in trigger condition table 301 corresponding to the trigger just fired. If resetting the flag bit in a particular row 302 of table 301 causes all trigger columns 303 of the row to contain zero values, then the cell of the same row at column 304 corresponding to all triggers is also reset to zero. As a result, when the corresponding trigger condition (e.g., a code path) is again encountered during execution, the in-line executable code of database management system 215 will check table 301, find a zero in the flag bit corresponding to the trigger condition, and will continue execution, ignoring the trigger. It will be observed that each executing process has its own trigger condition table 301, and therefore resetting a flag bit in one table has no effect on trigger execution in a different executing process. In other words, a trigger is only disabled within a particular defined scope. Preferably, this scope is the context of an executing process, although alternatives are disclosed herein.

It should be understood that this technique does not necessarily prevent all unnecessary firings of a trigger, but is intended to reduce the instances of unnecessary trigger firing and thereby improve performance, without imposing any substantial overhead burden. A simple example will illustrate both the effectiveness and limitations of this technique. Suppose for a given database, it is desirable to restrict editing of one or more specially protected fields of a table to a privileged class of users. Typically, a database management application will not support such a specific pre-defined condition for firing a trigger, and the developer of the trigger must therefore use, as a firing condition, some generic code path which alters a field in a database table. This means that (a) sometimes the trigger will be fired when data other than the specially protected field is being altered, in which case the trigger does nothing, and (b) sometimes the trigger will be fired when the specially protected field is being altered by a user of the privileged class, in which case again the trigger does nothing. Only if a protected field is being altered by someone not of the privileged class will the trigger take some action, as by generating an error message and preventing alteration of the field.

The exemplary trigger can be improved to reduce its execution overhead in accordance with the preferred embodiment by returning a special return code if the trigger determines that the user which invoked it is of the privileged class. The effect of returning the special return code is that the trigger, having been fired once and determined that the user has the required authority to alter the protected database field, need no longer fire again for that particular process, since the user, and the user's authority, will be the same. Thus, the same process can invoke many different database functions, and alter many records and many fields (both protected and not protected) of the database, without the need to fire the trigger each time. This can significantly reduce the instances of trigger firing.

On the other hand, if the trigger determines that the user lacks authority to alter the specially protected field, but that the field being altered is other than a specially protected field, the trigger still will not prevent alteration, but typically will not return a special return code. In this case, it may still be necessary to fire the trigger each time, because the user may later attempt to alter one of the protected fields. However, there could be other things the trigger could examine to determine whether it is necessary to fire again. For example, depending on the execution environment, if the trigger can determine that the application or the interface being used is unable to access the specially protected field, it may be safe to return a special return code and disable further firing of the trigger.

Figure 4:
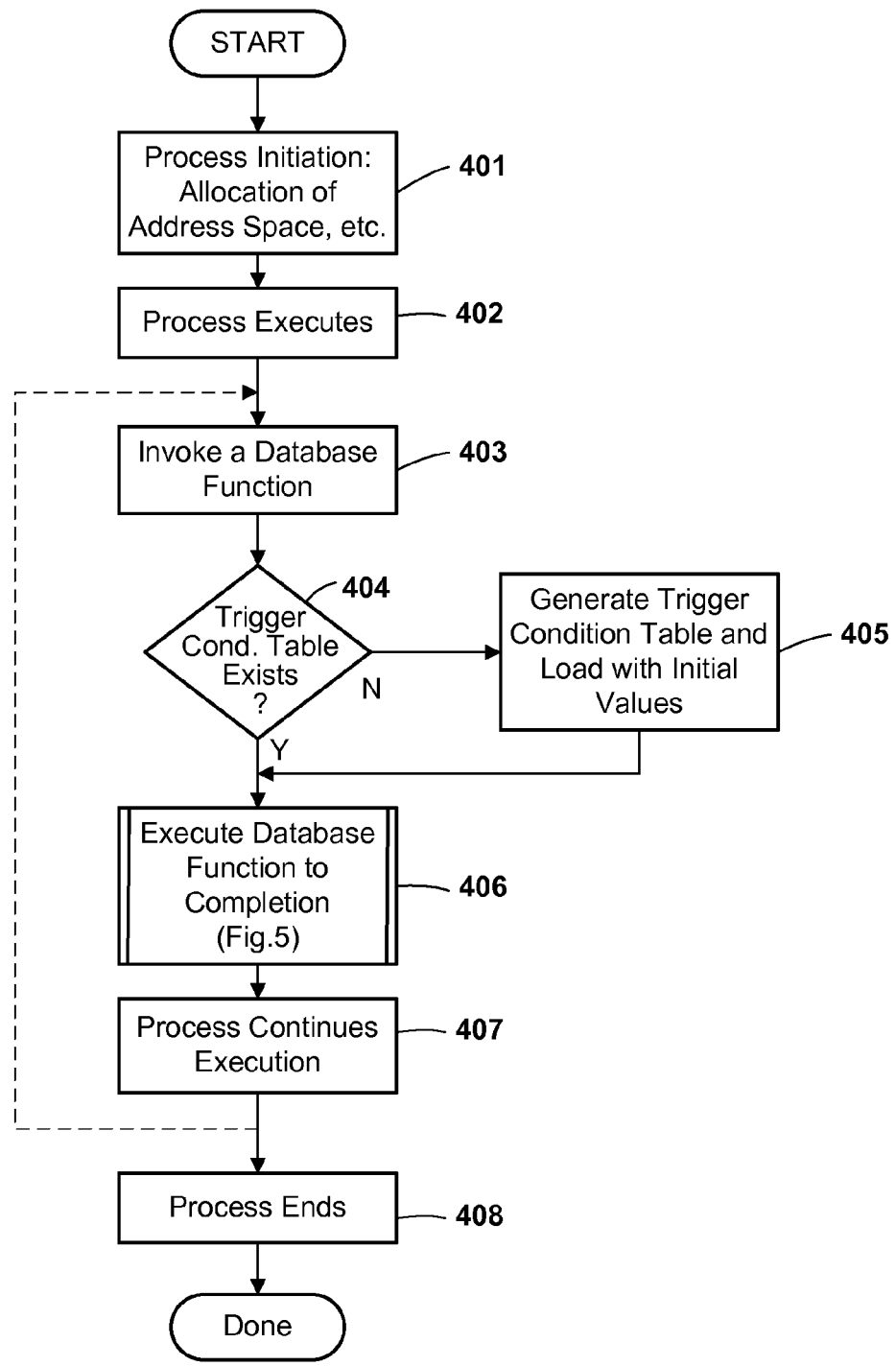
FIG. 4 is a flow diagram illustrating at a high level the execution of a process which invokes a database function within the computer system of FIG. 1, according to the preferred embodiment.

FIG. 4 is a flow diagram illustrating at a high level the execution of a process which invokes a database function within computer system 100, according to the preferred embodiment. In some operating environments, a "process" may be referred to as a "task" or by some other name. Referring to FIG. 4, a process is initiated in a conventional manner (block 401). Typically, OS kernel 201 creates any necessary entries for managing processes in its internal data structures, assigns default process parameters, and so forth. In particular, OS kernel 201 allocates a state data area 221 to the new process.

After initiation, the process executes, represented as block 402. Block 402 represents at a high level any arbitrary degree of process complexity, and could involve a single or multiple threads of execution, multiple called procedures to an arbitrary stack depth, and so forth. Process execution may involve a user application such as user applications 203-204, or may be a server process in communication with a client over a network which responds to client requests, or some other process. Process execution at block 402 could also involve comparatively little processing, and the database management application could be the first application invoked by the process.

At some point, the executing process invokes a function of database management application 215 (block 403). The database management application may be invoked through an application programming interface (API) intended to allow other applications to access the database, or may be invoked as a stand-alone application program itself. When a database management application function is invoked, database management application determines whether a trigger condition table 301 has been generated for the executing process. If not (the 'N' branch from block 404), the database management application creates a trigger condition table 222 in the state data area 221 of the executing process, and initializes it with initial flag bit values (block 405). This newly created trigger condition table is initially a copy of master trigger condition table 214, although it may later be modified.

The database management function that was invoked then continues to execute to completion. This is represented in FIG. 4 as block 406, and is shown and described in greater detail in FIG. 5.

Figure 5:
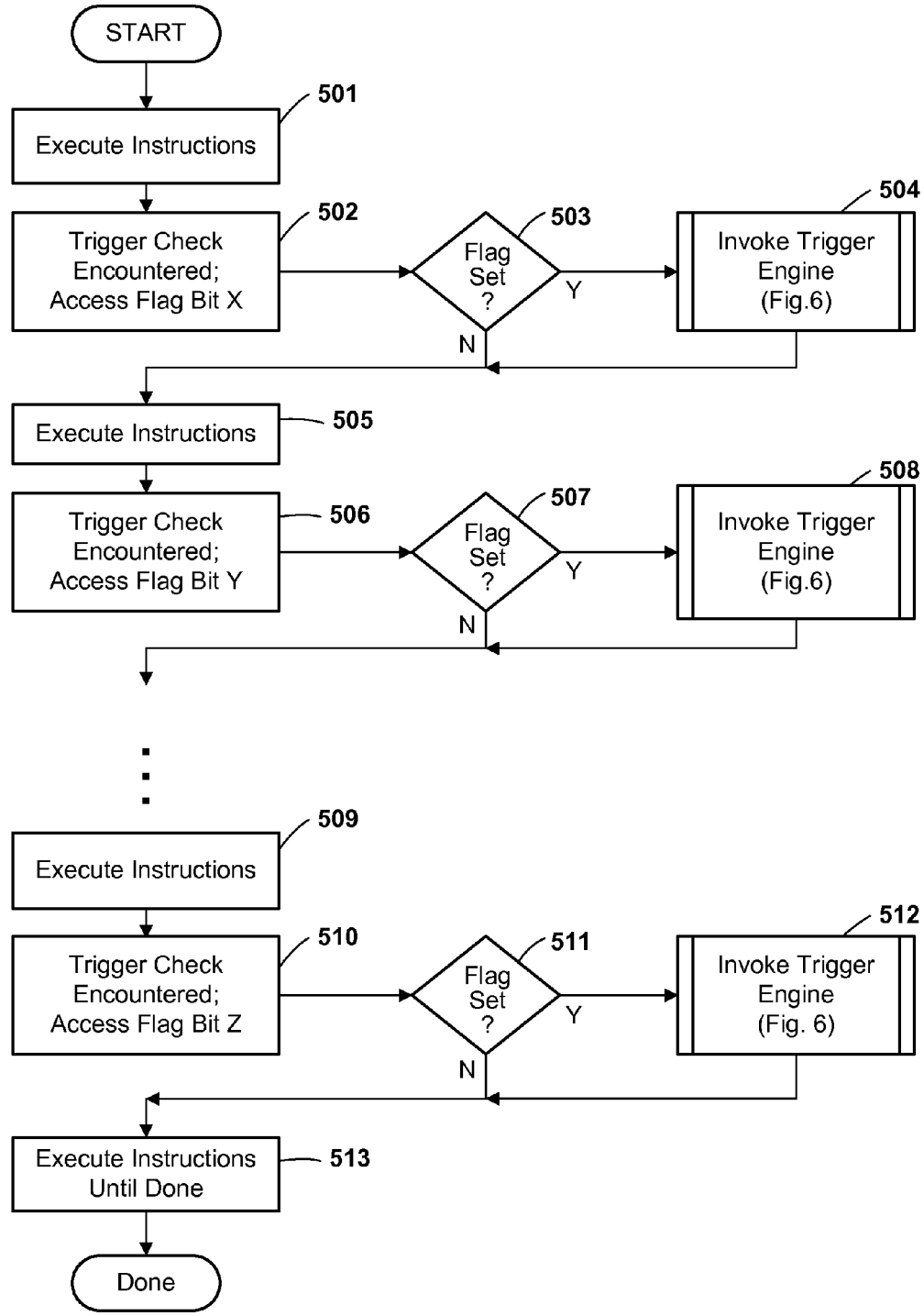
FIG. 5 is a flow diagram illustrating at a greater level of detail the execution of a database function invoked by an executing process, according to the preferred embodiment.

Referring to FIG. 5, the database function is performed by executing code within database management system 215 and/or external procedures called by it, represented as blocks 501, 505, 509 and 513. Any of blocks 501, 505, 509 and 513 could represent any arbitrary degree of process complexity, and could involve a single or multiple threads of execution, multiple called procedures to an arbitrary stack depth, and so forth.

At some point, a code path is taken which causes a trigger check to be encountered, represented as blocks 502, 506 and 510. A trigger check is preferably one or more in-line instructions which access a corresponding flag bit of the trigger condition table 222 for the executing process, and branch to invoke the trigger engine if the flag is set (the 'Y' branch from blocks 503, 507 and 511). Each trigger check within the code maps to a corresponding row 302 of the trigger condition table 222, the flag bit in the all triggers column 304 of the corresponding row being checked. Depending on the instruction set architecture, it may be possible to accomplish the trigger check in a single instruction, although more typically several instructions will be required. However, since the instructions are preferably in-line, the check itself requires very little resource, so long as the 'N' branch is taken from blocks 503, 507 or 511.

The invoked database function continues execution until done, represented by block 513. Trigger checks may be performed an arbitrary number of times; although three trigger checks are depicted in FIG. 5 for illustrative purposes, many execution instances of database functions incur a far greater number of trigger checks.

If any trigger check is performed and the corresponding flag bit is set (the 'Y' branch from block 503, 507 or 511), the executing database function invokes the database trigger engine 218 to fire one or more triggers. This is represented at a high level as blocks 504, 508 and 512 of FIG. 5, and shown in greater detail in FIG. 6.

Figure 6:
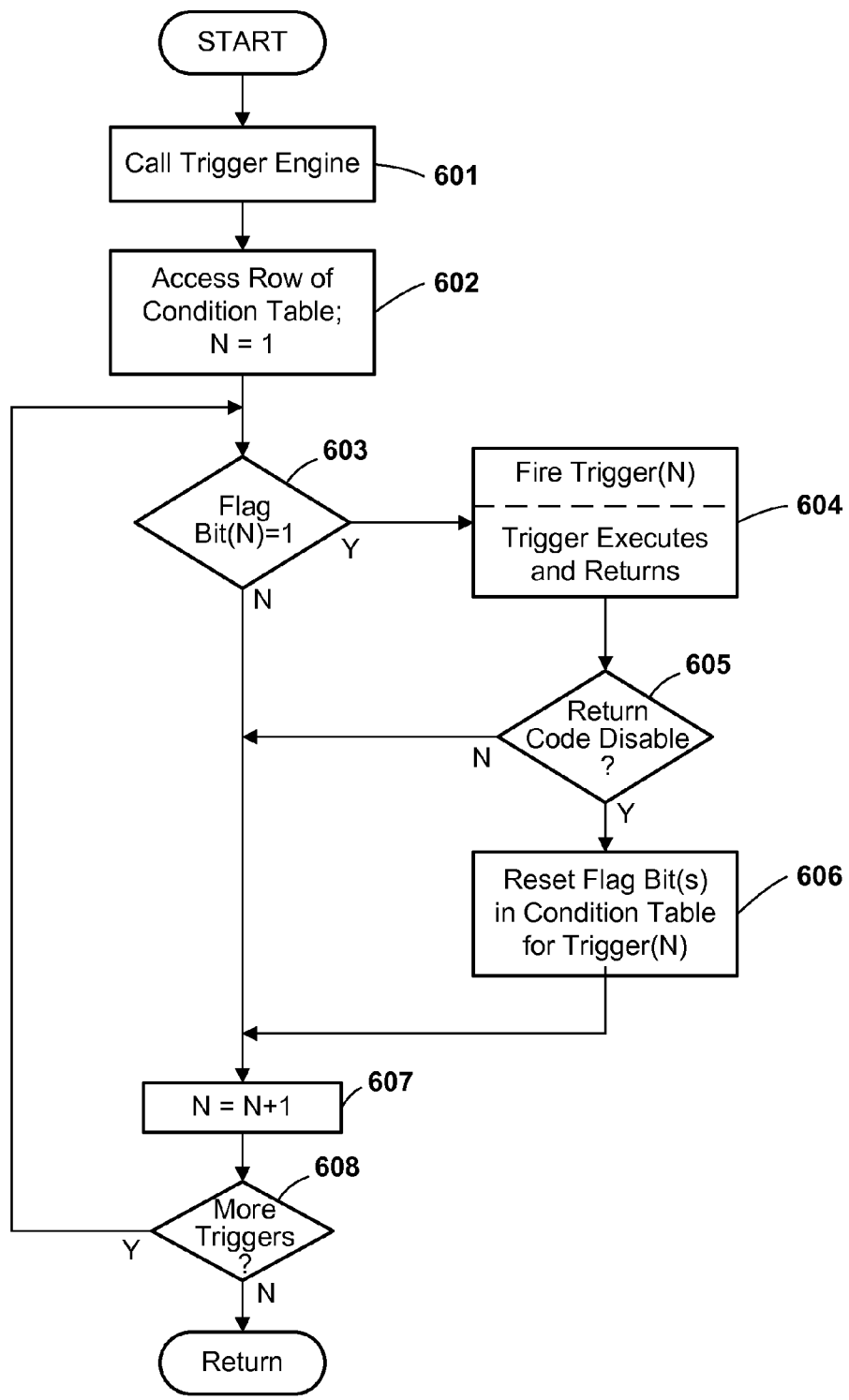
FIG. 6 is a flow diagram showing in greater detail the execution of a trigger engine function for firing one or more triggers, according to the preferred embodiment.

Referring to FIG. 6, the trigger engine is called (block 601), at least one of the call parameters being the condition which caused the trigger engine to be invoked. Invoking the trigger engine generally involves some overhead. The trigger engine will generally be contained in a module separate from the function which called it, although this is not necessarily the case. Upon being called, the trigger engine accesses the row 302 of trigger condition table 222 corresponding to the condition which caused it to be invoked (block 602). An index variable N is initialized to 1.

The trigger engine then examines each flag bit of the row in turn. If flag bit(N), i.e., the flag bit for the Nth column 303 of the row, is set (the 'Y' branch from block 603), then the trigger corresponding to the Nth column, Trigger(N), is fired (block 604). Firing the trigger means that the trigger engine 218 accesses the set of instructions of Trigger(N) and causes them to be performed. As explained previously, these could be previously compiled, processor-executable instructions which are executed as a called procedure, but are often a set of higher level language instructions which are interpreted or compiled at run time. In any case, there is substantial overhead involved in firing the trigger, even if very few instructions within the trigger need to be executed. Block 604 represents firing and execution of the trigger according to any conventional technique or technique hereafter developed. Upon completion of execution of the trigger, it returns with a return code to indicate status.

Upon completion of execution of the trigger, trigger engine 218 examines the return code (block 605). If the return code indicates that subsequent firings of the trigger are to be disabled (the 'Y' branch from block 605), the trigger engine resets all flag bits in column N of the trigger condition table to zero (block 606). For each flag bit which is reset, trigger engine also re-determines the corresponding flag bit in the all triggers column 304. If the return code does not indicate that subsequent firings should be disabled (the 'N' branch from block 605), then block 606 is by-passed, and trigger condition table is left unchanged.

Resetting the flag bits in column N of trigger condition table 222 at block 606 has the effect of disabling further firing of the trigger in the context of the currently executing process. In the preferred embodiment, all flag bits within column N are reset, which means that Trigger(N) is not only prevented from firing again for the same condition, but also for any other condition (if multiple conditions have been specified for causing Trigger(N) to fire). It would alternatively be possible to disable only firing from the same condition (i.e., the same code path), but to enable firing from a different code path, by resetting only the flag bit for the corresponding row and column. It would further be possible to provide multiple return codes, in which one or more indicate that further firings of Trigger(N) are to be prevented for all code paths, and one or more different return codes indicate that further firing of Trigger(N) is to be prevented only from the code path which caused it to fire.

The index variable is then incremented (block 607), and if more columns remain to be examined (the 'Y' branch from block 608), the next flag bit of the same row is examined at block 603. When all flag bits in the row have been examined, the 'N' branch is taken from block 608, and the trigger engine returns.

It will be observed that, since a separate flag bit is maintained independently in the row for each trigger, a single code path could cause multiple triggers to fire. Each trigger fires independently and provides its own return code, and therefore one trigger can be disabled without affecting any of the other triggers.

Returning again to FIG. 4, after completion of execution of the database function at block 406, the process may continue executing (represented as block 407), e.g., by executing code outside database management application, such as code within a user application 203-204. The process may invoke a database function again, and may do so an arbitrary number of times, as shown by the dashed line path back to block 403. If a database function is invoked multiple times, it may be the same database function or a different database function.

At some point, the process ends, represented as block 408. When the process ends, the corresponding process state data 221, including its trigger condition table 222, if any, is de-allocated and eventually overwritten with other data. Thus, any changes made to the trigger condition table 222 do not survive process termination, and do not affect any other executing process.

Although a specific sequence of operations is illustrated in the flow diagrams and described in the accompanying text, it will be appreciated that some operations could be performed in a different order, that some operations need not be performed, and that other operations may be performed instead, consistent with the present invention.

In the preferred embodiment, a trigger may be disabled in the scope of an executing process. However, it would alternatively be possible to disable triggers in some other context. For example, the scope of disabling a trigger could be the context of a single invocation of a database function, represented in FIG. 4 by blocks 403-406. In this case, if the same process were to invoke the same or a different database function after the first function completed execution, then a new trigger condition table would be allocated as a copy of master trigger condition table 214, and any previously disabled trigger would again be enabled. A database trigger might also be disabled only within the scope of a single called procedure within database management application, or within some other context. As will be appreciated by those of skill in the art, any suitable scope could be implemented by placing the database trigger table in an appropriate location in the process stack or using other conventional devices.

As an additional alternative, it would be possible to maintain multiple database trigger tables corresponding to different contexts. For example, a process-context trigger condition table, as well as a trigger condition table limited to some called procedure, could be maintained. A return code received from a trigger could indicate whether the trigger is to be disabled only within the scope of the executing procedure, or in the scope of the executing process, or not at all.

In the preferred embodiment, database management application 215 includes all necessary code to automatically maintain the master trigger condition table 214, allocate trigger condition tables 222 to executing processes, fire triggers according to the data in the trigger condition tables, and dynamically modify the trigger condition tables 222 responsive to special return codes received from executed triggers. However, trigger engine 218 can only disable further trigger firing responsive to return codes generated by the triggers. The trigger developer must therefore include logic within the trigger which causes the appropriate return code to be generated. Typically, the logic for detecting the underlying condition must be included in the trigger anyway, e.g., to prevent the trigger from performing an action. The developer must include one or more instructions in the trigger which will cause the appropriate return code to be generated if this underlying condition is detected. Development of a trigger, as with development of any computer instructions, is generally a manual process, although certain editing tools (not shown) may be provided for that purpose.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, compact disk read only memories (CD-ROM's), digital versatile disks (DVD's), and magnetic tape, it being understood that these examples are not exhaustive. Examples of non-transitory computer-readable media are illustrated in FIG. 1 as system memory 102 and data storage devices 125-127.

Unless inconsistent with the invention or otherwise qualified herein, computer program code for carrying out operations of the present invention may be written in any combination of one or more programming languages, including an object oriented programming language such as the JAVA(198) programming language, SMALLTALK(198) programming language, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A method for executing a database application having at least one database trigger, comprising the computer-executed steps of:
    executing at least one function of a database application to cause a database trigger to fire;
    responsive to firing said database trigger, executing internal logic within said database trigger to determine whether said database trigger should be disabled from further firing within a pre-defined scope;
    receiving return data generated by execution of said database trigger, said return data including results of determining whether said database trigger should be disabled from further firing within said pre-defined scope; and
    selectively disabling further firing of said database trigger within said pre-defined scope depending on the value of said return data.

2. The method of claim 1, wherein said pre-defined scope is a scope of an executing process in a system supporting multiple concurrently executing processes, each on behalf of a respective user.

3. The method of claim 1, further comprising:
    associating a trigger state data structure with said pre-defined scope, said trigger state data structure recording, for each of a plurality of possible trigger conditions, any trigger which is currently enabled for the corresponding trigger condition;
    wherein selectively disabling further firing of said database trigger within said pre-defined scope comprises modifying said trigger state data structure to indicate that said trigger is disabled for one or more of said possible trigger conditions.

4. The method of claim 3, wherein associating said trigger state data structure with said pre-defined scope comprises generating said trigger state data structure as a copy of a master trigger state data structure, and wherein modifying said trigger state data structure associated with said pre-defined scope does not include modifying said master trigger state data structure.

5. The method of claim 3, wherein said trigger state data structure comprises separate respective data corresponding to each said possible trigger condition, said separate respective data comprising: (a) a flag indicating whether any triggers are enabled for the corresponding possible trigger condition, and (b) data identifying any triggers enabled for the corresponding trigger condition.

6. The method of claim 1, wherein said return data comprises an SQL return code.

7. The method of claim 1, wherein the method is performed by a database management application supporting a pre-defined set of trigger conditions and a variable number of user-defined triggers, each trigger containing instructions according to a pre-defined trigger syntax and specified to fire upon the occurrence of one or more respective trigger conditions of said pre-defined set of trigger conditions.

8. A computer program product for managing database functions, comprising:
    a plurality of computer-executable instructions recorded on non-transitory computer readable media, wherein said instructions, when executed by at least one computer system, cause the at least one computer system to:
    detect during execution of a database function that a previously defined condition for firing a database trigger has been met;
    responsive to detecting during execution of a database function that a previously defined condition for firing a database trigger has been met, cause said database trigger to fire;
    receive return data generated by execution of said database trigger, said return data including results of determining whether said database trigger should be disabled from further firing within a pre-defined scope generated by executing internal logic within said database trigger responsive to firing said database trigger; and
    selectively disable further firing of said database trigger within said pre-defined scope depending on the value of said return data.

9. The computer program product of claim 8, wherein said computer program product is a general purpose database management application which supports: defining a database having user specified parameters; creation, editing and removal of records in the database; and performing of logical queries against data in the database.

10. The computer program product of claim 8, wherein said pre-defined scope is a scope of an executing process in a system supporting multiple concurrently executing processes, each on behalf of a respective user.

11. The computer program product of claim 8, wherein said instructions further cause the computer system to:
    associate a trigger state data structure with said pre-defined scope, said trigger state data structure recording, for each of a plurality of possible trigger conditions, any trigger which is currently enabled for the corresponding trigger condition;
    wherein said instructions selectively disable further firing of said database trigger within said pre-defined scope by modifying said trigger state data structure to indicate that said trigger is disabled for one or more of said possible trigger conditions.

12. The computer program product of claim 11, wherein said instructions associate said trigger state data structure with said pre-defined scope by generating said trigger state data structure as a copy of a master trigger state data structure, and wherein said instructions modify said trigger state data structure associated with said pre-defined scope without modifying said master trigger state data structure.

13. The computer program product of claim 11, wherein said trigger state data structure comprises separate respective data corresponding to each said possible trigger condition, said separate respective data comprising: (a) a flag indicating whether any triggers are enabled for the corresponding possible trigger condition, and (b) data identifying any triggers enabled for the corresponding trigger condition.

14. The computer program product of claim 8, wherein said return data comprises an SQL return code.

15. The computer program product method of claim 8, wherein the computer program product supports a pre-defined set of trigger conditions and a variable number of user-defined triggers, each trigger containing instructions according to a pre-defined trigger syntax and specified to fire upon the occurrence of one or more respective trigger conditions of said pre-defined set of trigger conditions.

16. A computer system, comprising:
a memory;
at least one processor, said at least one processor executing instructions storable in said memory;
a structured database containing data storable in said memory;
a database trigger manager embodied as instructions executable on said at least one processor for managing the firing of one or more database triggers for said structured database, each database trigger of said one or more database triggers having a respective at least one pre-defined firing condition;
wherein said database trigger manager, responsive to detecting the occurrence of a pre-defined firing condition of a database trigger of said one or more database triggers, causes the corresponding database trigger to fire, and receives return data generated by execution of the corresponding database trigger, said return data including results of determining whether said database trigger should be disabled from further firing within a pre-defined scope generated by executing internal logic within said database trigger responsive to firing said database trigger; and
wherein said database trigger manager selectively disables further firing of the corresponding database trigger within a pre-defined scope depending on the value of said return data.

17. The computer system of claim 16, wherein said database trigger manager is included in a general purpose database management application which supports: defining a database having user specified parameters; creation, editing and removal of records in the database; and performing of logical queries against data in the database.

18. The computer system of claim 16, wherein said pre-defined scope is a scope of an executing process in a system supporting multiple concurrently executing processes, each on behalf of a respective user.

19. The computer system of claim 16, wherein a trigger state data structure is associated with said pre-defined scope, said trigger state data structure recording, for each of a plurality of possible trigger conditions, any trigger which is currently enabled for the corresponding trigger condition;
wherein said database trigger manager selectively disables further firing of said database trigger within said pre-defined scope by modifying said trigger state data structure to indicate that said trigger is disabled for one or more of said possible trigger conditions.

20. The computer system of claim 16, wherein said database trigger manager supports a pre-defined set of trigger conditions and a variable number of user-defined triggers, each trigger containing instructions according to a pre-defined trigger syntax and specified to fire upon the occurrence of one or more respective trigger conditions of said pre-defined set of trigger conditions.

* * * * *